US012620666B2

(12) United States Patent
Thayer et al.

(10) Patent No.: US 12,620,666 B2
(45) Date of Patent: May 5, 2026

(54) BATTERY MODULE MID PLANE CROSSMEMBER MOUNT

(71) Applicant: Rivian IP Holdings, LLC, Plymouth, MI (US)

(72) Inventors: Brandon Thayer, Aliso Viejo, CA (US); Ryan Arens, Hilliard, OH (US); Bruce Edwards, Menlo Park, CA (US); Kyle Butterfield, Ladera Ranch, CA (US); Manjot Kalkat, Tustin, CA (US); Mandar Vaidya, Farmington, MI (US); Tripur Mahajan, Westerville, OH (US); Alen Antony, Irvine, CA (US); Daniel Heibel, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 821 days.

(21) Appl. No.: 17/820,087

(22) Filed: Aug. 16, 2022

(65) Prior Publication Data

US 2024/0063493 A1     Feb. 22, 2024

(51) Int. Cl.
| | |
|---|---|
| *H01M 50/264* | (2021.01) |
| *B60L 50/64* | (2019.01) |
| *H01M 10/613* | (2014.01) |
| *H01M 10/625* | (2014.01) |
| *H01M 10/6554* | (2014.01) |
| *H01M 50/204* | (2021.01) |
| *H01M 50/249* | (2021.01) |

(52) U.S. Cl.
CPC .......... *H01M 50/264* (2021.01); *B60L 50/64* (2019.02); *H01M 10/613* (2015.04); *H01M 10/625* (2015.04); *H01M 10/6554* (2015.04);

*H01M 50/204* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,557,415 | B2 | 10/2013 | Herron et al. |
| 8,702,161 | B2 | 4/2014 | Charbonneau et al. |
| RE44,994 | E | 7/2014 | Rawlinson et al. |
| 8,875,828 | B2 | 11/2014 | Rawlinson et al. |
| 9,045,030 | B2 | 6/2015 | Rawlinson et al. |

(Continued)

FOREIGN PATENT DOCUMENTS

| | | |
|---|---|---|
| DE | 10217204531 A1 | 9/2018 |
| JP | 2021-041783 A | 3/2021 |

OTHER PUBLICATIONS

Office Action on DE Appl. No. 102023121774.7 dated Nov. 3, 2025, with machine translation.

*Primary Examiner* — Ryan S Cannon
*Assistant Examiner* — Karen J. Armstrong
(74) *Attorney, Agent, or Firm* — Foley & Lardner LLP

(57) ABSTRACT

An apparatus that can define at least one compartment in a battery pack to receive a battery module is disclosed. The apparatus can include a first member that extends from the first side of the battery pack to the second side of the battery pack. The apparatus can include a second member and a third member that together run cross car and extend from the first side to the second side of the battery pack, except with a gap between the second member and the third member.

15 Claims, 11 Drawing Sheets

(56) References Cited

U.S. PATENT DOCUMENTS

| | | | |
|---|---|---|---|
| 9,577,227 B2 | 2/2017 | Sumpf et al. | |
| 10,020,550 B2 | 7/2018 | Sumpf et al. | |
| 10,023,038 B2 | 7/2018 | Rawlinson et al. | |
| 10,780,767 B2 | 9/2020 | Rawlinson et al. | |
| 12,035,459 B2 | 7/2024 | Coakley et al. | |
| 2008/0057393 A1* | 3/2008 | Onuki ............... | H01M 10/0481 |
| | | | 429/159 |
| 2018/0102565 A1* | 4/2018 | Yamamoto ........ | H01M 10/0472 |
| 2018/0337374 A1* | 11/2018 | Matecki ................... | B60K 1/04 |
| 2020/0212390 A1* | 7/2020 | Kume .............. | H01M 10/6554 |

* cited by examiner

1000

1005

Provide Battery Pack

BATTERY MODULE MID PLANE CROSSMEMBER MOUNT

INTRODUCTION

Electric vehicles can require batteries for power. The distance the electric vehicle can travel can depend on characteristics of the batteries.

SUMMARY

The present disclosure is directed towards providing an apparatus that can define at least one compartment in a battery pack to receive a battery module. The apparatus can include a first member that extends from the first side of the battery pack to the second side of the battery pack. The apparatus can include a second member and a third member that together run cross car and extend from the first side to the second side of the battery pack, except with a gap between the second member and the third member. The battery pack can experience forces outside of threshold values that can result in movement of or changes to the battery pack, which can hinder optimum performance of the battery pack and electric vehicle. Providing a battery module mount that includes at least three members can help increase the threshold value of force a battery pack can withstand before battery pack movement or changes occur because it allows the load to be distributed across the first member while the second member and the third member provide space for other vehicles components.

At least one aspect is directed to an apparatus. The apparatus can include a first member. The first member can couple with a first side of a battery pack and with a second side of the battery pack. The apparatus can include a second member. The second member can couple with the first member and with the first side of the battery pack. The first member and the second member can define a first compartment for a first battery module. The apparatus can include a third member. The third member can couple with the first member and with the second side of the battery pack. The first member and the third member can define a second compartment for a second battery module.

At least one aspect is directed to a method. The method can include coupling a first member with a first side of a battery pack and with a second side of the battery pack. The method can include coupling a second member with the first member and with the first side of the battery pack. The method can include coupling a third member with the first member and with the second side of the battery pack.

At least one aspect is directed to an electric vehicle. The electric vehicle can include a battery pack. The electric vehicle can include a first member. The first member can couple with a first side of a battery pack and with a second side of the battery pack. The electric vehicle can include a second member. The second member can couple with the first member and with the first side of the battery pack. The electric vehicle can include a third member. The third member can couple with the first member and with the second side of the battery pack.

At least one aspect is directed to a battery pack. The battery pack can include a first member to couple with a first side of a battery pack and with a second side of the battery pack. The battery pack can include a second member to couple with the first member and with the first side of the battery pack. The battery pack can include a third member to couple with the first member and with the second side of the battery pack.

At least one aspect is directed to a method. The method can include providing a battery pack. The battery pack can include a first member. The first member can couple with a first side of a battery pack and with a second side of the battery pack. The battery pack can include a second member. The second member can couple with the first member and with the first side of the battery pack. The battery pack can include a third member. The third member can couple with the first member and with the second side of the battery pack.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
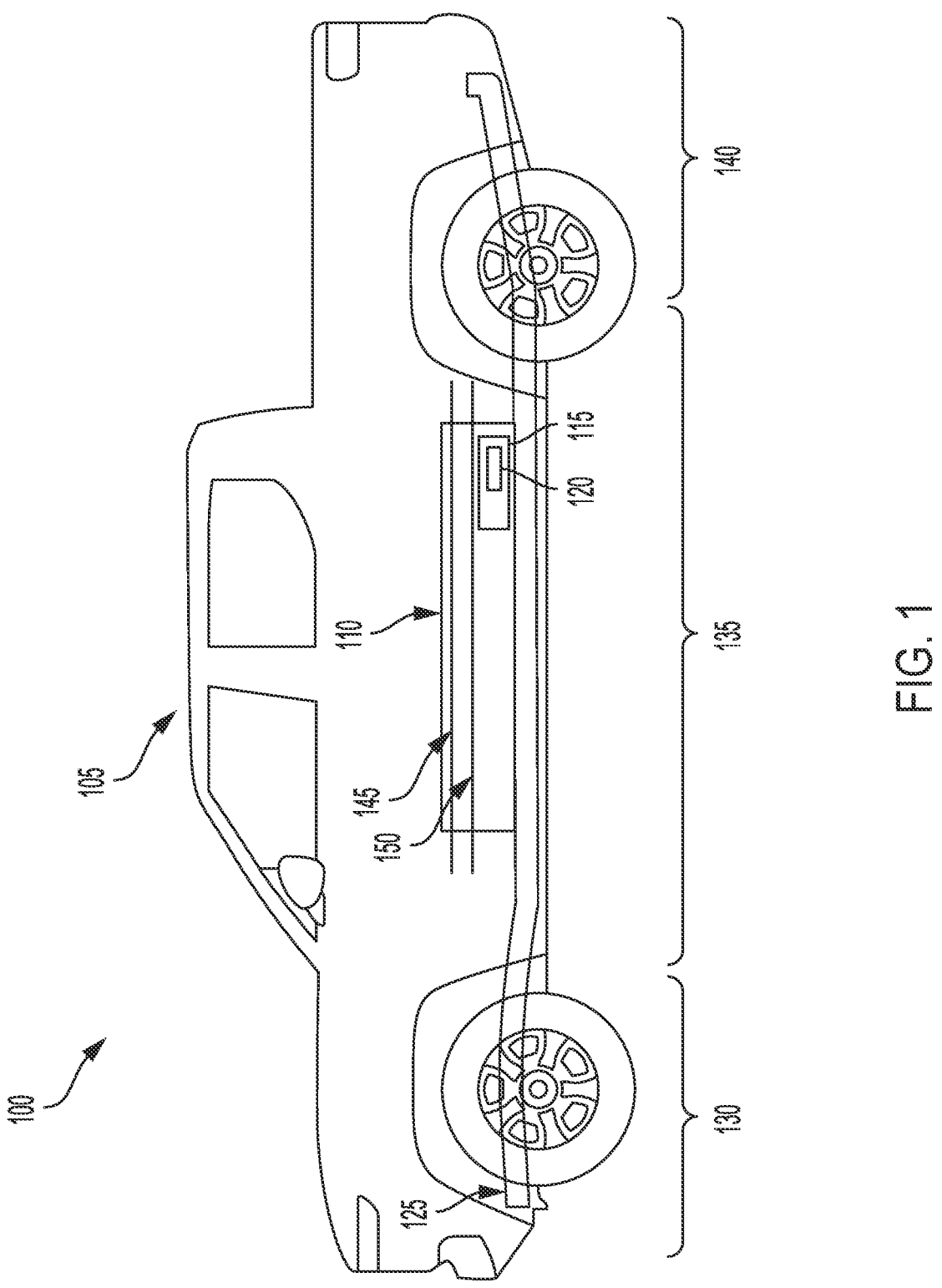
FIG. 1 depicts a side view of an electric vehicle, according to an exemplary embodiment.

Following below are more detailed descriptions of various concepts related to, and implementations of, methods, apparatuses, and systems of a crossmember mount of an electric vehicle battery pack. The various concepts introduced above and discussed in greater detail below may be implemented in any of numerous ways.

The present disclosure is directed to an apparatus that can define at least one compartment in a battery pack to receive a battery module. Battery packs or components thereof can move or shift slightly with use such that optimum performance of the battery pack can be hindered. For example, battery packs that experience forces outside of threshold values can move, shift, or change before battery packs with higher threshold values that experience the same forces. Such movement of the battery pack can lead to changes to the battery modules housed within, hindering the performance of the battery pack or battery modules, or the electric vehicle.

The battery pack can experience forces that can be too high for optimum performance of the battery pack and electric vehicle. For example, the electric vehicle, and thus the battery pack, can experience an impact force. The impact force can exceed a threshold value such that the battery pack can shift, move, or change. Additionally, the tires of the electric vehicle can be on uneven terrain with the tires not on an even plane relative to each other, and as a result the battery pack can experience torsion. The torsion can exceed a threshold value such that the battery pack can shift, move, or change. This can hinder optimum performance of the battery pack or electric vehicle. Thus, there can be a need to improve the structural efficiency of the battery pack to maximize performance of the electric vehicle.

Systems and methods of the present technical solution can provide an apparatus, such as a mount apparatus, for an electric vehicle battery pack that can define at least one compartment in a battery pack to receive a battery module while improving structural efficiency of the battery pack. The apparatus can include three members—a first member, a second member, and a third member. These members can be or can include structural elements of or within the battery pack. They can provide structural support to the battery pack and they can at least partially define areas for placement of battery modules within the battery pack. The first member (e.g., a keystone cross member) can cross the battery pack laterally and engage or couple with a first side of the battery pack and with a second side of the battery pack. The first member can provide structural support to the battery pack that increases the threshold value of force the battery pack can experience prior to any movement or change to the battery pack. For example, the first member can distribute a load experienced by the first side or the second side of the battery pack across the length of the first member so that the battery pack is not changed. A second member can couple with the first side of the battery pack and with the first member. A third member can couple with the second side of the battery pack and with the first member. For example, the second member and third member can be aligned with and underneath (in an operational orientation of the battery pack) the first member. The second member and the third member can each extend approximately (e.g., +/−10%) half way across the battery pack, and the first member can extend approximately (e.g., +/−10%) the entire way across the battery pack. Each battery pack can include multiple rows of this three member arrangement to define compartments for battery modules, to integrate with other batter pack components, to provide structural support to the battery pack, and to facilitate assembly of the battery pack and its components.

The disclosed solutions have a technical advantage of optimizing the structural efficiency while increasing process and dimensional efficiency. The second member and the third member can each extend approximately (e.g., +/−10%) half way across the battery pack such that there is a gap between the second member and the third member. The gap can optimize process efficiency. For example, the gap can enable a coolant manifold to be assembled prior to mounting a battery module and easily accessed after mounting the battery module. The three member apparatus can provide dimensional improvements. For example, the apparatus can enable mounting a battery module with the plane of the battery module mount at the center of gravity of the battery module, which optimizes stability of the battery pack. Controlling the structural efficiency in this manner can increase the threshold value of force the battery pack can experience and can help provide more effective dimensions and processing, both of which can optimize the performance and life of the battery pack and the electric vehicle.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
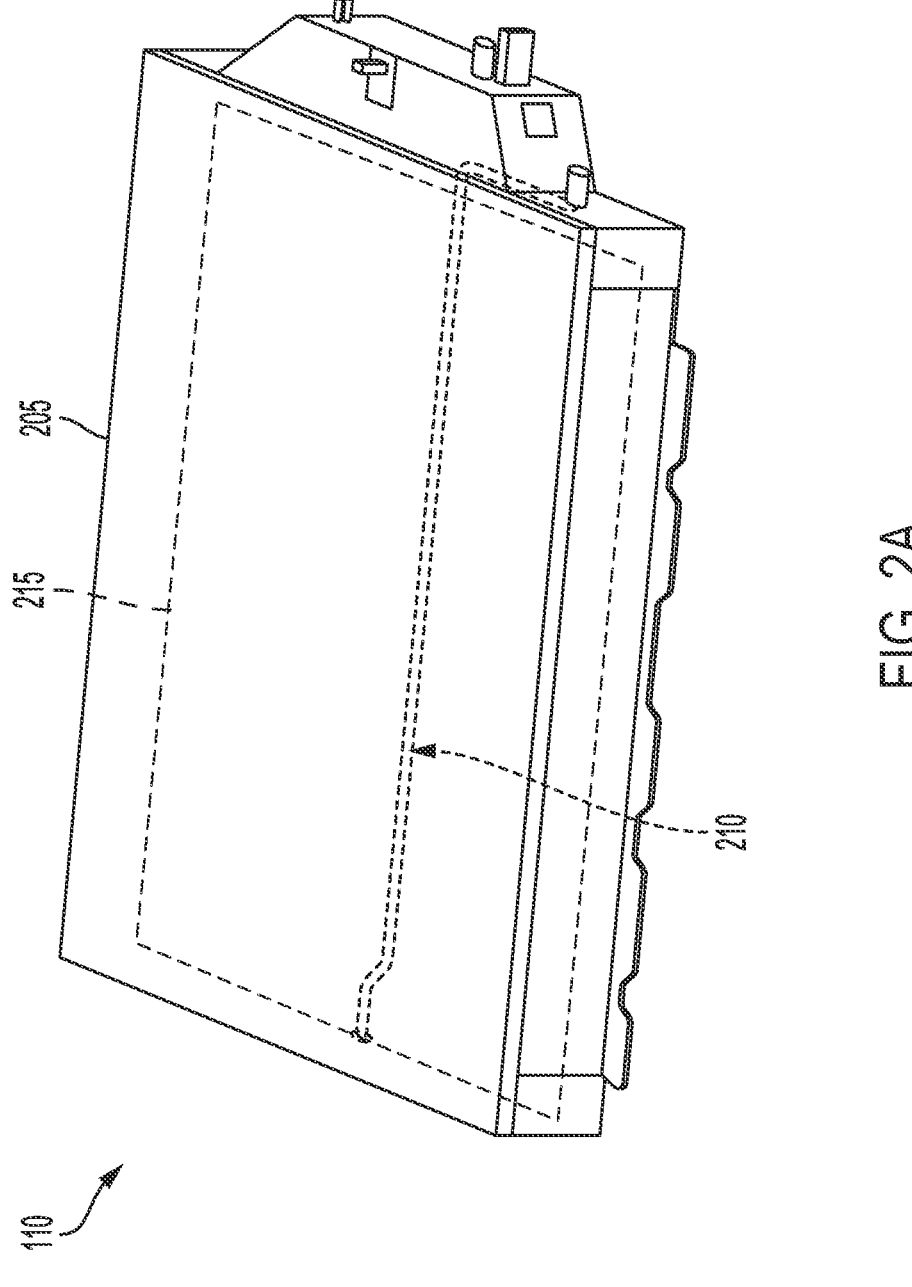
FIG. 2A depicts a perspective view of a battery pack, according to an exemplary embodiment.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
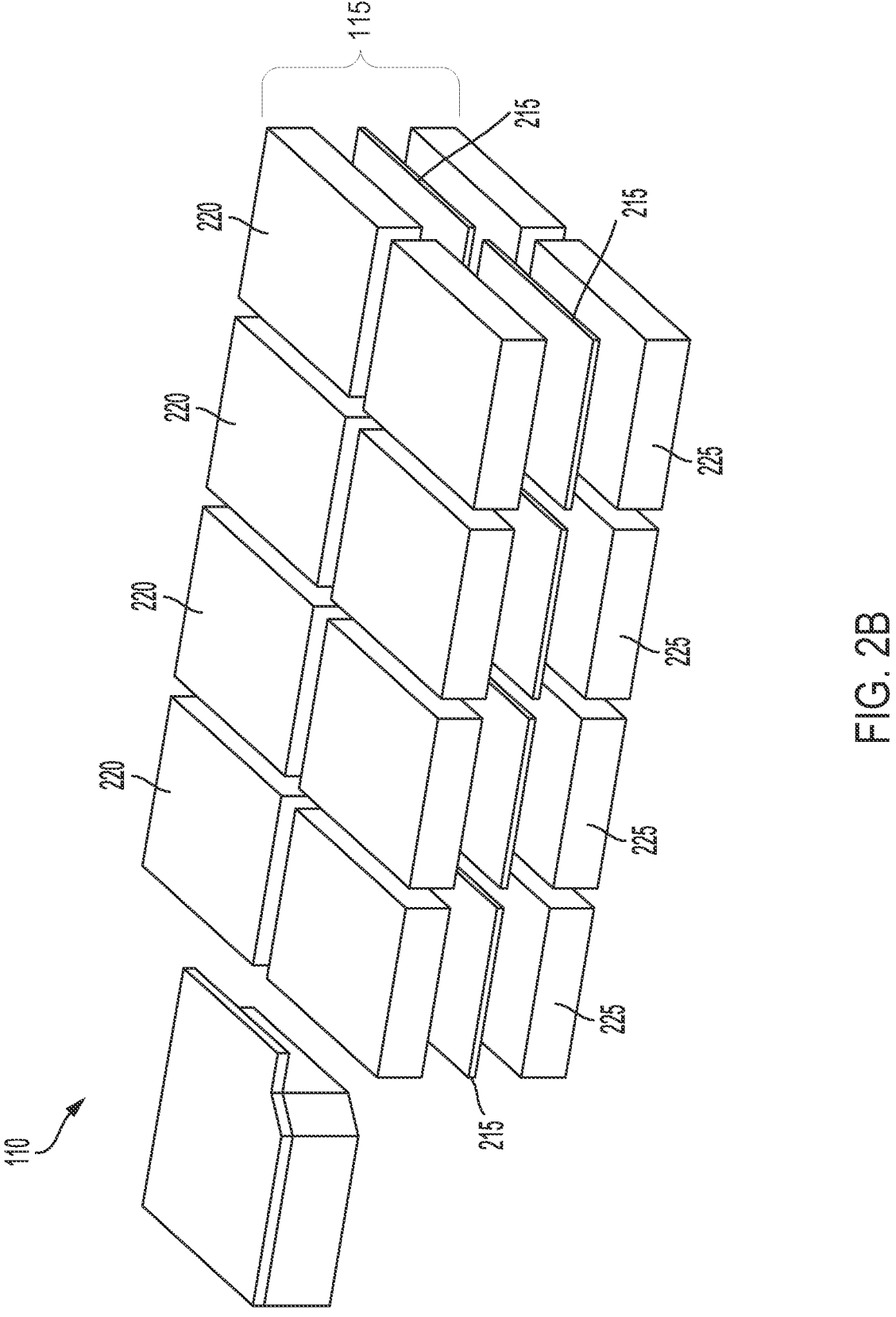
FIG. 2B depicts a perspective view of a battery module, according to an exemplary embodiment.

FIG. 2B depicts example battery modules 115. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery pack 110 can include any number of battery modules 115. For example, the battery pack can have one, two, three, four, five, six, seven, eight, nine, ten, eleven, twelve or other number of battery modules 115 disposed in the housing 205. The battery pack 110 can include or define a plurality of areas (e.g., compartments) for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

The battery modules 115 can each include a plurality of battery cells 120. The battery modules 115 can be disposed within the housing 205 of the battery pack 110. The battery modules 115 can include battery cells 120 that are cylindrical cells, pouch cells, or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

Figure 3:
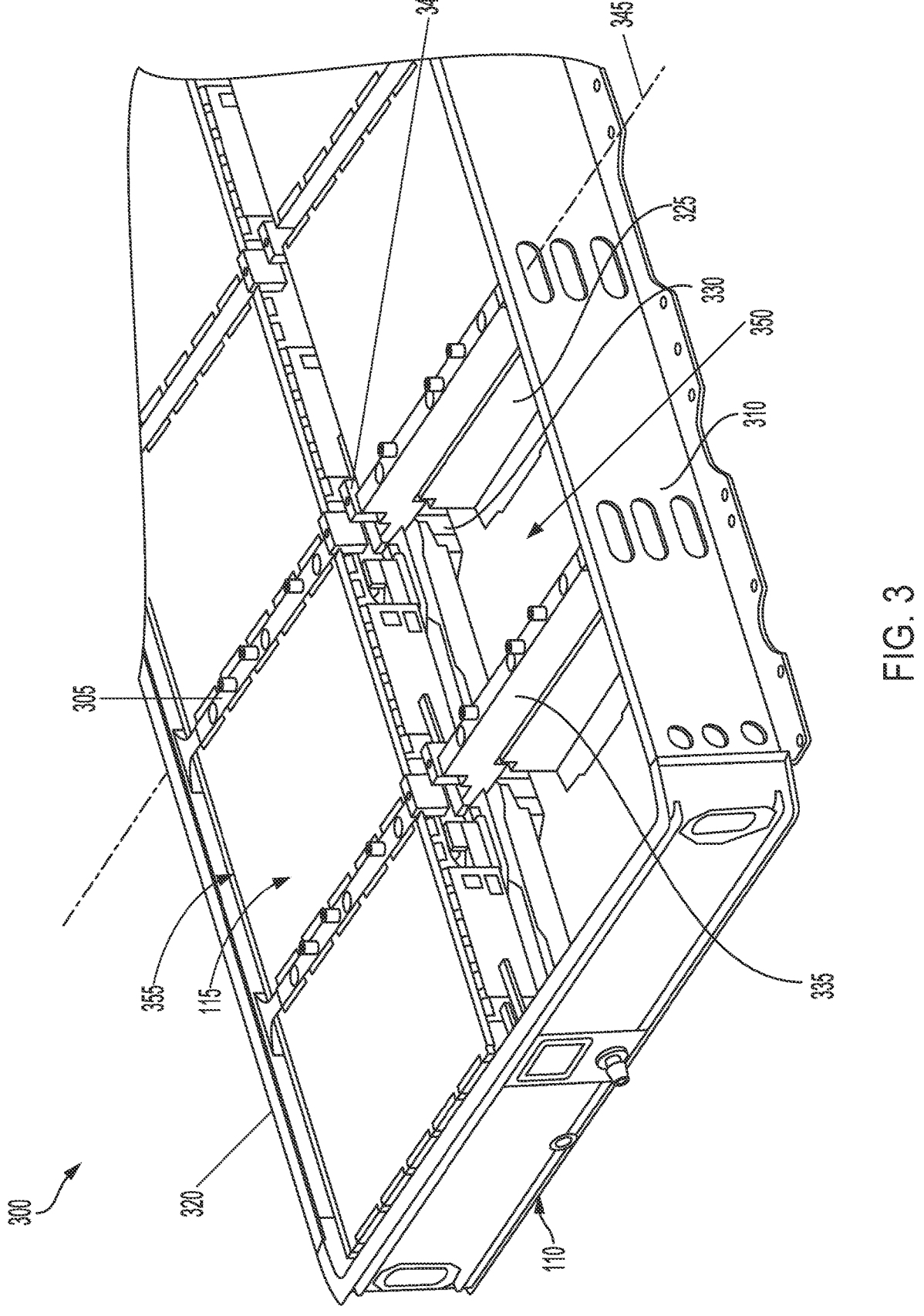
FIG. 3 depicts a perspective view of a battery pack system, according to an exemplary embodiment.

FIG. 3 depicts a perspective view of a battery pack system 300. The battery pack system 300 can include at least one battery pack 110. The battery pack system 300 can include at least one bus bar bracket 340. The bus bar bracket 340 can couple with a busbar, e.g., the first busbar 145 or the second busbar 150. The bus bar bracket 340 can couple with the first busbar 145 and another element of the battery pack system 300, as discussed herein.

The battery pack 110 can include at least one first side 310 and at least one second side 320. The first side 310 and the second side 320 can be an integral part of the battery pack 110. For example, the first side 310 and the second side 320 can be part of the battery pack 110 or welded to the battery pack 110. The first side 310 and the second side 320 can be parallel. Other elements of the battery pack 110 can be coupled with the first side 310 and the second side 320. The sides 310, 320 can be made of plastic, metal or a combination of plastic and metal. For example, the sides 310, 320 can be made of high impact polystyrene. For example, the sides 310, 320 can be made of aluminum. For example, the sides 310, 320 can be made of a combination of acetal (also known as polyacetal or polyoxymethylene (POM)) and aluminum. The sides 310, 320 can be made of another material or combination of materials.

The battery pack system 300 can include at least one first member 305, e.g., a first lateral cross member. The first member 305 can be referred to herein as a keystone member 305. The bus bar bracket 340 can couple with the first member 305. For example, the bus bar bracket 340 can couple with the first busbar 145 and the first member 305 such that the first busbar 145 and the first member 305 are coupled. The first member 305 can couple with the first side 310 of the battery pack 110. The first member 305 can couple with the second side 320 of the battery pack 110. For example, the first member 305, e.g., the first lateral cross member, can extend approximately (e.g., +/−10%) the entire way across the battery pack 110. The first member 305 can be coupled indirectly with the sides 310, 320 of the battery pack 110. For example, a second member 325 can be welded to the first side 310 of the battery pack 110 and the first member 305 can be in contact with the second member 325 such that it is effectively coupled with the first side 310 of the battery pack 110.

The battery pack system 300 can include at least one fourth member 335, e.g., a fourth lateral cross member. The fourth member 335 can be different from the first member 305. The fourth member 335 can be the same as or similar to the first member 305 (e.g., the same or similar dimensions). For example, the fourth member 335 can couple with the first side 310 of the battery pack 110. For example, the fourth member 335 can couple with the second side 320 of the battery pack 110. The fourth member 335, e.g., the fourth lateral cross member, can extend approximately (e.g., +/−10%) the entire way across the battery pack 110. The fourth member 335 can be coupled indirectly with the sides 310, 320 of the battery pack 110. The fourth member 335 can be approximately (e.g., +/−10%) parallel with the first member 305. For example, the first member 305 and the fourth member 335 can each couple with the first side 310 at different locations. For example, the first member 305 and the fourth member 335 can each couple with the second side 320 at different locations.

The battery pack system 300 can include at least one second member 325, e.g., a second lateral cross member, and at least one third member 330, e.g., a third lateral cross member. The second member 325 can couple with the first side 310 of the battery pack 110. For example, the second member 325, e.g., the second lateral cross member, can extend approximately (e.g., +/−10%) half way across the battery pack 110. The third member 330 can couple with the second side 320 of the battery pack 110. For example, the third member 330, e.g., the third lateral cross member, can extend approximately (e.g., +/−10%) half way across the battery pack 110.

The second member 325 can couple with the first member 305. The third member 330 can couple with the first member 305. For example, the second member 325 and the third member 330 can be aligned with the first member 305. For example, the second member 325 and the third member 330 can be underneath (in an operational orientation of the battery pack) the first member 305, e.g., the first member 305 can be above (in an operational orientation of the battery pack) the second member 325 and the third member 330. The first member 305 and the second member 325 can define a first compartment 350. For example, the first compartment 350 can receive the battery module 115, e.g., a first battery module. The first compartment 350 can be referred to herein as a first module bay 350. The first member 305 and the third member 330 can define a second compartment 355. The second compartment 355 can be referred to herein as a second module bay 355. The second compartment 355, e.g., the second module bay 355, can receive the battery module 115, e.g., a second battery module, as depicted in FIG. 3, among others.

The battery pack system 300 can include at least one longitudinal axis 345. The longitudinal axis 345 can extend from and beyond the first side 310 and the second side 320 of the battery pack 110. For example, the first side 310 and the second side 320 of the battery pack 110 can be orthogonal to the longitudinal axis 345. The second member 325 and the third member 330 can be aligned together along the longitudinal axis 345. The first member 305 can extend between the first side 310 and the second side 320 of the battery pack 110 such that the first member 305 is along the longitudinal axis 345.

The members 305, 325, 330 can be disposed within the battery pack. For example, the first member 305 can extend across the battery pack 110 from the first side 310 to the second side 320. The second member 325 can be underneath the first member 305, each disposed in the battery pack 110 (e.g., the second member 325 can be between the battery pack 110 and the first member 305). The second member 325 can be coupled with the first side 310 of the battery pack 110 and can extend 40-50% across the battery pack 110 from the first side 310 and along the longitudinal axis 345. The third member 330 can be underneath the first member 305, each disposed in the battery pack 110 (e.g., the third member 330 can be between the battery pack 110 and the first member 305). The third member can be coupled with the second side 320 of the battery pack 110 and can extend 40-50% across the battery pack 110 from the second side 320 and along the longitudinal axis 345. The members 305, 325, 330 can be in alignment with each other along the longitudinal axis 345.

Figure 4:
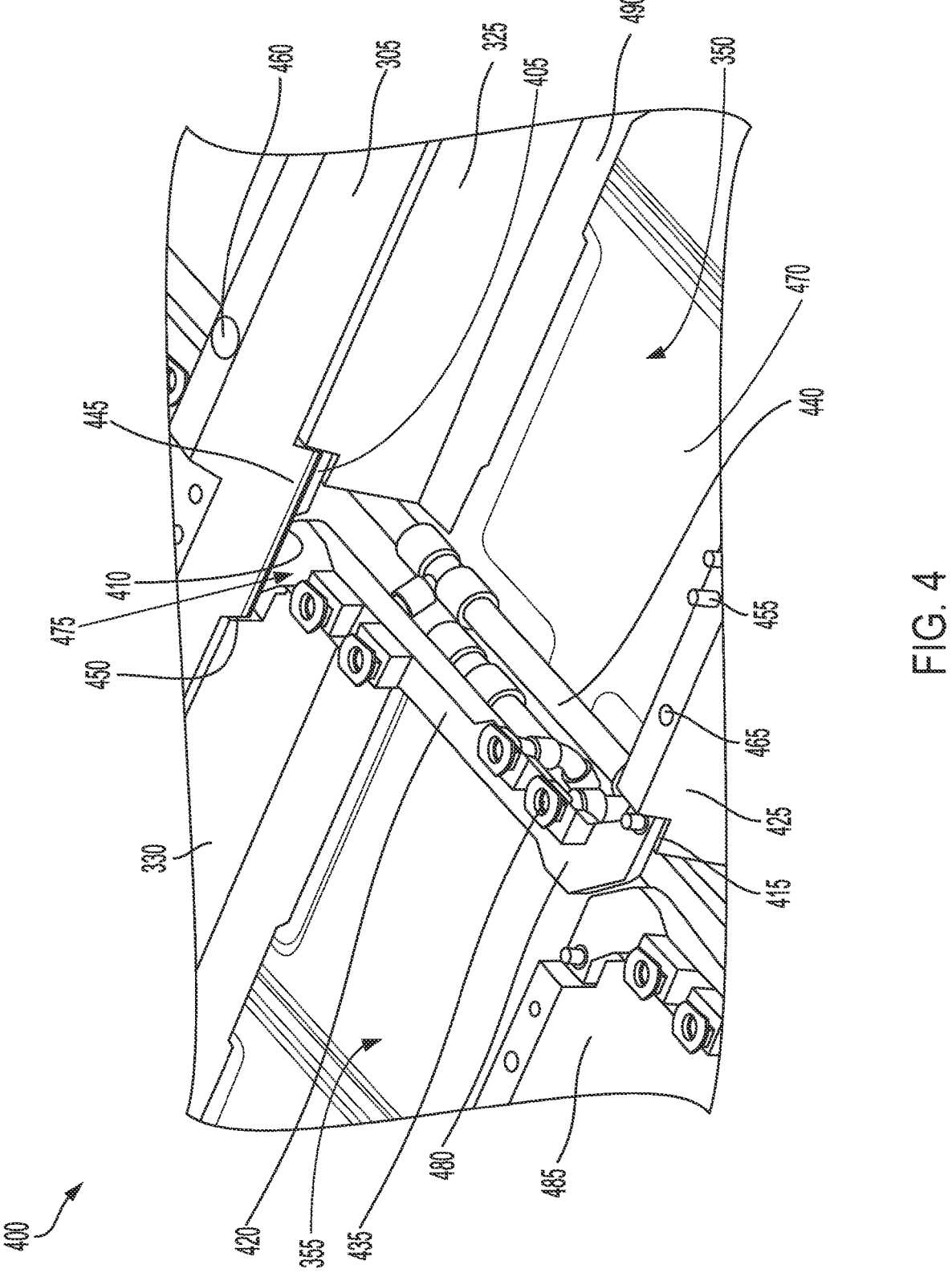
FIG. 4 depicts a perspective view of a portion of the battery pack system, according to an exemplary embodiment.

FIG. 4 depicts a perspective view of a portion 400 of the battery pack system 300. The battery pack system 300 can include at least one fifth member 425, e.g., a fifth lateral cross member. The fifth member 425 can be different from the second member 325. The fifth member 425 can be the same as or similar to the second member 325 (e.g., the same or similar dimensions). For example, the fifth member 425 can couple with the first side 310 of the battery pack 110. The fifth member 425 can be parallel with the second member 325. For example, the fifth member 425 and the second member 325 can each couple with the first side 310 of the battery pack 110 at different locations.

The first member 305 and the third member 330 can define the second compartment 355. For example, the battery pack system 300 can include at least one sixth member

485, e.g., a sixth lateral cross member, to couple below the fourth member 335 (in an operational orientation of the battery pack) and the members 305, 330, 335, 485, a second bracket 420, and the second side 320 of the battery pack 110 can define the second compartment 355. The sixth member 485 and the third member 330 can be oriented (in an operational orientation of the battery pack) the same as the second member 325 and the fifth member 425, except the members 485, 330 can be coupled with the second side 320 of the battery pack 110 instead of the first side 310 of the battery pack 110.

The battery pack system 300 can include at least one base 470. For example, the base 470 can be the internal, bottom surface (in an operational orientation of the battery pack) of the battery pack 110. The second member 325, the third member 330, and the fifth member 425 can each be coupled with separate portions of the base 470. For example, the members 325, 330, 425 can each be welded to the base 470, bolted to the base 470, or glued to the base 470 via an adhesive.

The members 325, 330, 425, 485 can each include at least one flange 490. For example. The flange 490 of the second member 325 is depicted in FIG. 4, among others. The flange 490 can be disposed at the bottom (in an operation orientation of the battery pack) of the members 325, 330, 425, 485 as depicted in FIG. 4, among others. The flange 490 can secure the members 325, 330, 425, 485 to the base 470 of the battery pack system 300. For example, the flange 490 of the members 325, 330, 425, 485 can be welded, bolted, or glued via an adhesive to the base 470. The flange 490 can engage with the battery module 115. For example, the flange 490 can couple with the battery module 115. For example, the flange 490 can engage with the bottom submodule 225 of the battery module 115. The flange 490 can be disposed at the top (in an operation orientation of the battery pack) of the members 325, 330, 425, 485. For example, the flange 490 can engage with the top submodule 220 of the battery module 115. The members 325, 330, 425, 485 can each include the flange 490 at the bottom (in an operation orientation of the battery pack) of the members 325, 330, 425, 485 and can each include the flange 490 at the top (in an operation orientation of the battery pack) of the members 325, 330, 425, 485.

The first member 305 and the fourth member 335 of the battery pack system 300 can each include at least one protrusion 445, e.g., a keystone element. For example, the protrusion 445 of the first member 305 is depicted in FIG. 4, among others. For example, the first member 305 can be similar to or the same as the fourth member 335 (e.g., the same or similar dimensions), which can streamline the manufacturing process of the battery pack 110 by making it easier to produce the components and couple the components to the battery pack 110. The first member 305 can be different from the fourth member 335. For example, the protrusion 445 of the first member 305 can have different dimensions than the protrusion of the fourth member 335. The second member 325, the third member 330, and the fifth member 425 can each include at least one end surface 450. For example, the end surface 450 of the third member 330 is depicted in FIG. 4, among others. For example, the members 325, 330, 425 can be similar to or the same as each other, which can streamline the manufacturing process of the battery pack 110 by making it easier to produce the components and couple the components to the battery pack 110. For example, the second member 325 and the fifth member 425 can have the same structure and be oriented in the same direction (in an operational orientation of the battery pack).

The members 325, 330, 425 can be different from each other. For example, the members 325, 330, 425 can have the same structure, however, the fifth member 425 can be oriented in an opposite direction as the second member 325 and the third member 330 (in an operational orientation of the battery pack). For example, the members 325, 330, 425 can have different dimensions. The protrusion 445 of the members 305, 335 can contact the end surface 450 of the members 325, 330, 425. For example, the protrusion 445 of the first member 305 can engage the end surface 450 of the second member 325 and the end surface 450 of the third member 330, as depicted in FIG. 4, among others.

The second member 325, the third member 330, and the fifth member 425 can each include at least one locating element 455. For example, the locating element 455 of the fifth member 425 is depicted in FIG. 4, among others. The locating element 455 can enable the members 325, 330, 425 and the members 305, 335 to locate each other. For example, the locating element 455 of the members 325, 330 can locate the first member 305. For example, the locating element 455 of the fifth member 425 can locate the fourth member 335. The locating element 455 can enable the members 325, 330, 425 and the members 305, 335 to couple with each other. For example, the locating element 455 can be a rod that can be received by a portion defined by the members 305, 335. For example, the locating element 455 of the members 325, 330 can couple with the first member 305. For example, the locating element 455 of the fifth member 425 can couple with the fourth member 335.

The first member 305 and the fourth member 335 can each define at least one clearance bolt hole 460. For example, the first member 305 can define a first clearance bolt hole and a second clearance bolt hole. The second member 325, the third member 330, and the fifth member 425 can each define at least one bolt hole 465. The clearance bolt hole 460 can enable the members 305, 335 to couple with the members 325, 330, and 425 via a bolt. For example, the bolt hole 465 can receive a bolt provided through the clearance bolt hole 460. For example, the first member 305 can define the clearance bolt hole 460, e.g., a first clearance bolt hole, and the second member 325 can define the bolt hole 465, e.g., a first bolt hole. The first member 305 can couple with the second member 325 via a bolt to engage with the first bolt hole and the first clearance bolt hole. For example, the first member 305 can define the clearance bolt hole 460, e.g., a second clearance bolt hole, and the third member 330 can define the bolt hole 465, e.g., a second bolt hole. The first member 305 can couple with the third member 330 via a second bolt to engage with the second bolt hole and the second clearance bolt hole.

The first member 305 and the fourth member 335 of the battery pack system 300 can each include at least one bottom surface 410. For example, the bottom surface 410 of the first member 305 is depicted in FIG. 4, among others. The second member 325, the third member 330, and the fifth member 425 can each include at least one top surface 415. For example, the top surface 415 of the second member 325 is depicted in FIG. 4, among others. The bottom surface 410 and the top surface 415 can vertically align (in an operational orientation of the battery pack).

The battery pack system 300 can include at least one bracket. For example, the battery pack system 300 can include a first bracket 405 and a second bracket 420. The brackets 405, 420 can be similar to or the same as each other. The brackets 405, 420 can be approximately (e.g., +/−10%) orthogonal to the longitudinal axis 345. The brackets 405, 420 can each include a first end 475 and a second end 480.

For example, the first end 475 and the second end 480 of the second bracket 420 is depicted in FIG. 4, among others. The first bracket 405 can couple with the first member 305 and the second member 325. For example, the first bracket 405 can couple with the bottom surface 410 of the first member 305 and with the top surface 415 of the second member 325 with the first member 305 above the second member 325 (in an operational orientation of the battery pack). For example, the first bracket 405 can couple with the bottom surface 410 of the first member 305 and with the top surface 415 of the second member 325 with the first member 305 above the first bracket 405 and the second member 325 below the first bracket 405 (in an operational orientation of the battery pack).

The second bracket 420 can couple with the members 305, 330, 335, 425. For example, the first end 475 of the second bracket 420 can couple with the first member 305 and the third member 330. For example, the second end 480 of the second bracket 420 can couple with the fourth member 335 and the fifth member 425. For example, the second bracket 420 can diagonally couple the first member 305 and the third member 330 with the fourth member 335 and the fifth member 425. For example, the second bracket 420 can couple the first member 305 and the third member 330 with the fourth member 335 and the fifth member 425 with the first member 305 and the third member 330 catty corner from the fourth member 335 and the fifth member 425. The second bracket 420 can couple with the bottom surface 410 of the fourth member 335 and with the top surface 415 of the fifth member 425 with the fourth member 335 above the second bracket 420 and the fifth member 425 below the second bracket 420 (in an operational orientation of the battery pack).

The battery pack system 300 can include at least one fluid manifold 440. The fluid manifold 440 can be approximately (e.g., +/−10%) orthogonal to the longitudinal axis 345. The fluid manifold 440 can be below the second bracket 420 (in an operational orientation of the battery pack). The fluid manifold 440 can provide fluid throughout the battery pack system 300. For example, the fluid manifold 440 can provide a coolant to the battery module 115.

The brackets 405, 420 can each define at least one opening. For example, the second bracket 420 can define the opening 435, as depicted in FIG. 4, among others. The opening 435 can be in fluid communication with the fluid manifold 440. For example, the fluid manifold 440 can provide a coolant to the battery module 115 via the opening 435. The second bracket 420 can define the opening 435 between the first member 305 and the fourth member 335.

The first member 305, the second member 325, the fourth member 335, and the fifth member 425 can define the first compartment 350 for the battery module 115 e.g., the first battery module. For example, with the members 325, 425 coupled with the base 470 of the battery pack 110 and the first member 305 coupled with the second member 325 and the fourth member 335 coupled with the fifth member 425, there is a space between the members 305, 325 and the members 335, 425. The space, e.g., the first compartment 350, can receive the battery module 115. Additionally, the members 305, 325, 335, 425, the second bracket 420, and the first side 310 of the battery pack 110 can also define the first compartment 350 for the battery module 115.

The members 305, 325, 330, 335, 425, 485 can be made of plastic, metal or a combination of plastic and metal. For example, the members 305, 325, 330, 335, 425, 485 can be made of high impact polystyrene. For example, the members 305, 325, 330, 335, 425, 485 can be made of steel. For example, the members 305, 325, 330, 335, 425, 485 can be made of a combination of acetal and steel. The members 305, 325, 330, 335, 425, 485 do not have to be made of the same material. For example, the members 305, 335 can be made of steel and the members 325, 330, 425, 485 can be made of acetal. The members 305, 325, 330, 335, 425, 485 can be made of another material or combination of materials.

Figure 5:
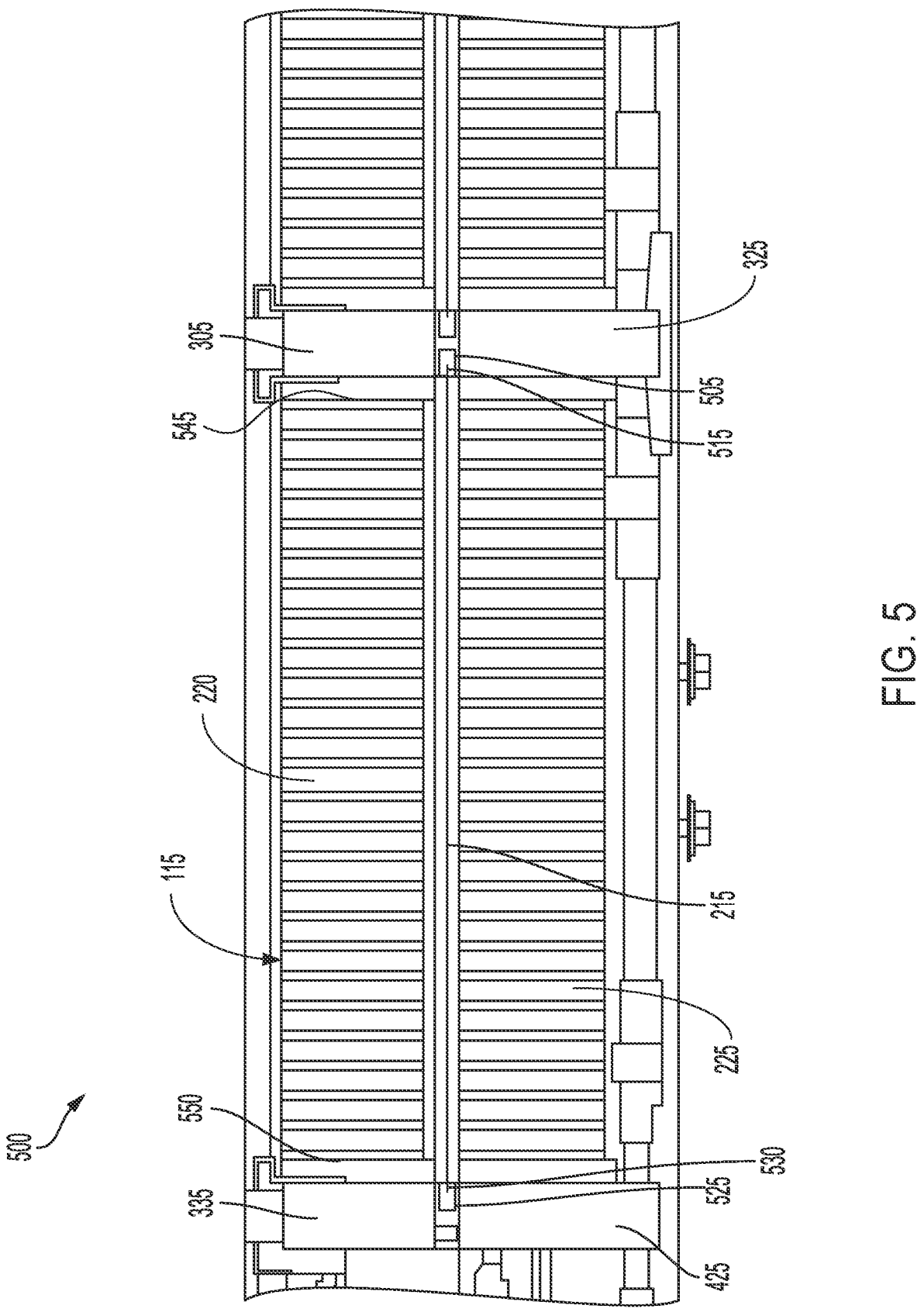
FIG. 5 depicts a side view of a battery pack system, according to an exemplary embodiment.

FIG. 5 depicts a side view 500 of the battery pack system 300. The battery pack system 300 can include the battery module 115. The battery module 115 can include the top submodule 220. The battery module 115 can include the bottom submodule 225. For example, the top submodule 220 can be above the bottom submodule 225 (in an operational orientation of the battery pack). For example, the top submodule 220 and the bottom submodule 225 can be positioned such that other elements of the battery pack system 300 can be positioned in between the submodules 220, 225.

The battery module 115 can include at least one module flange. For example, the battery module 115 can include a first module flange 505 and a second module flange 525. The module flanges 505, 525 can be similar to or the same as each other (e.g., dimensionally). Other battery modules 115 can include the module flanges 505, 525. For example, a second battery module can include the second module flange 525. The module flanges 505, 525 can be partially hollow. For example, the module flanges 505, 525 can receive other elements of the battery pack system 300. The first module flange 505 can be disposed at a first edge 545 of the battery module 115, e.g., a first battery module. For example, the first module flange 505 can be disposed approximately (e.g., +/−10%) at a half way point of the first edge 545 of the battery module 115. The second module flange 525 can be disposed at a second edge 550 of the battery module 115, e.g., the first battery module. For example, the second module flange 525 can be disposed approximately (e.g., +/−10%) at a half way point of the second edge 550 of the battery module 115. For example, the first module flange 505 and the second module flange 525 can be aligned. With the module flanges 505, 525 approximately (e.g., +/−10%) at a half way point of the battery module 115, the module flanges 505, 525 are at the center of gravity of the battery module 115. Having the module flanges 505, 525 at the center of the gravity of the battery module 115 can help to balance the battery pack system 300. Providing the battery module 115 with the module flanges 505 can help increase the threshold value of force the battery pack system 300 can withstand because it allows the load to be distributed across the module flanges 505. For example, a simple and short load path is provided for an applied force to take. Implementing the module flanges 505, 525 at the center of the gravity of the battery module 115 can allow for an optimum mechanical advantage. For example, the stress loading on the module flanges 505, 525 can be less at the areas of stress concentration than if the module flanges 505, 525 were to include multiple corners.

The first member 305 can engage with the first module flange 505. The second member 325 can engage with the first module flange 505. For example, the first module flange 505 can be positioned between the first member 305 and the second member 325. The fourth member 335 can engage with the second module flange 525. The fifth member 425 can engage with the second module flange 525. For example, the second module flange 525 can be positioned between fourth member 335 and the fifth member 425. Multiple battery modules 115 can include the module flanges 505, 525. For example, the first member 305 can engage with the second module flange 525 of a second battery module, e.g., the battery module 115. The third member 330 can engage with the second module flange 525 of the second battery module, e.g., the battery module 115. For example, the second module flange 525 of the second battery module, e.g., the battery module 115, can be positioned between first member 305 and the third member 330.

The second member 325, the third member 330, and the fifth member 425 can each include at least one locating element 455. For example, the locating element 455 of the fifth member 425 is depicted in FIG. 4, among others. The locating element 455 can enable the members 325, 330, 425 and the members 305, 335 to locate each other. Additionally, the locating element 455 can enable the members 325, 330, 425 and the module flanges 505, 525 to locate each other. For example, in the event that the module flanges 505, 525 are not positioned between the members 325, 330, 425 and the members 305, 335, the locating element 455 can enable the members 325, 330, 425 and the members 305, 335 to locate each other. For example, the event that the module flanges 505, 525 are positioned between the members 325, 330, 425 and the members 305, 335, the locating element 455 can enable the members 325, 330, 425 to locate the module flanges 505, 525. For example, the second member 325 can include the locating element 455. The locating element 455 can locate a portion of the first module flange 505 and couple with the portion.

The battery module 115 of the battery pack system 300 can include at least one thermal component 215. For example, the battery module 115 can include a first thermal component and a second thermal component. For example, the first thermal component can be positioned between the top submodule 220 and the bottom submodule 225 of the first battery module, e.g., the battery module 115. For example, the second thermal component can be positioned between the top submodule 220 and the bottom submodule 225 of the second battery module, e.g., the battery module 115. For example, the first battery module, e.g., the battery module 115, can include the first thermal component, e.g., thermal component 215, and the first module flange 505 with the first module flange 505 positioned between the first member 305 and the second member 325. For example, the second battery module, e.g., the battery module 115, can include the second thermal component, e.g., thermal component 215, and the second module flange 525 with the second module flange 525 positioned between the first member 305 and the third member 330.

The thermal component 215 can include a first portion 515. The thermal component 215 can include a second portion 530. The first portion 515 and the second portion 530 can expand. For example, the first portion 515 and the second portion 530 can expand relative to a change in temperature. For example, a fluid can run through the thermal component 215. The fluid can be a temperature above or below the ambient temperature of the battery module 115. In the event that the fluid if above the ambient temperature of the battery module 115, the thermal component 215 can expand to compensate for the expansion of the fluid. The first portion 515 of the thermal component 215 can be received by the first module flange 505. For example, the first module flange 505 can be partially hollow to receive the first portion 515 of the thermal component 215. The second portion 530 of the thermal component 215 can be received by the second module flange 525. For example, the second module flange 525 can be partially hollow to receive the second portion 530 of the thermal component 215.

Figure 6:
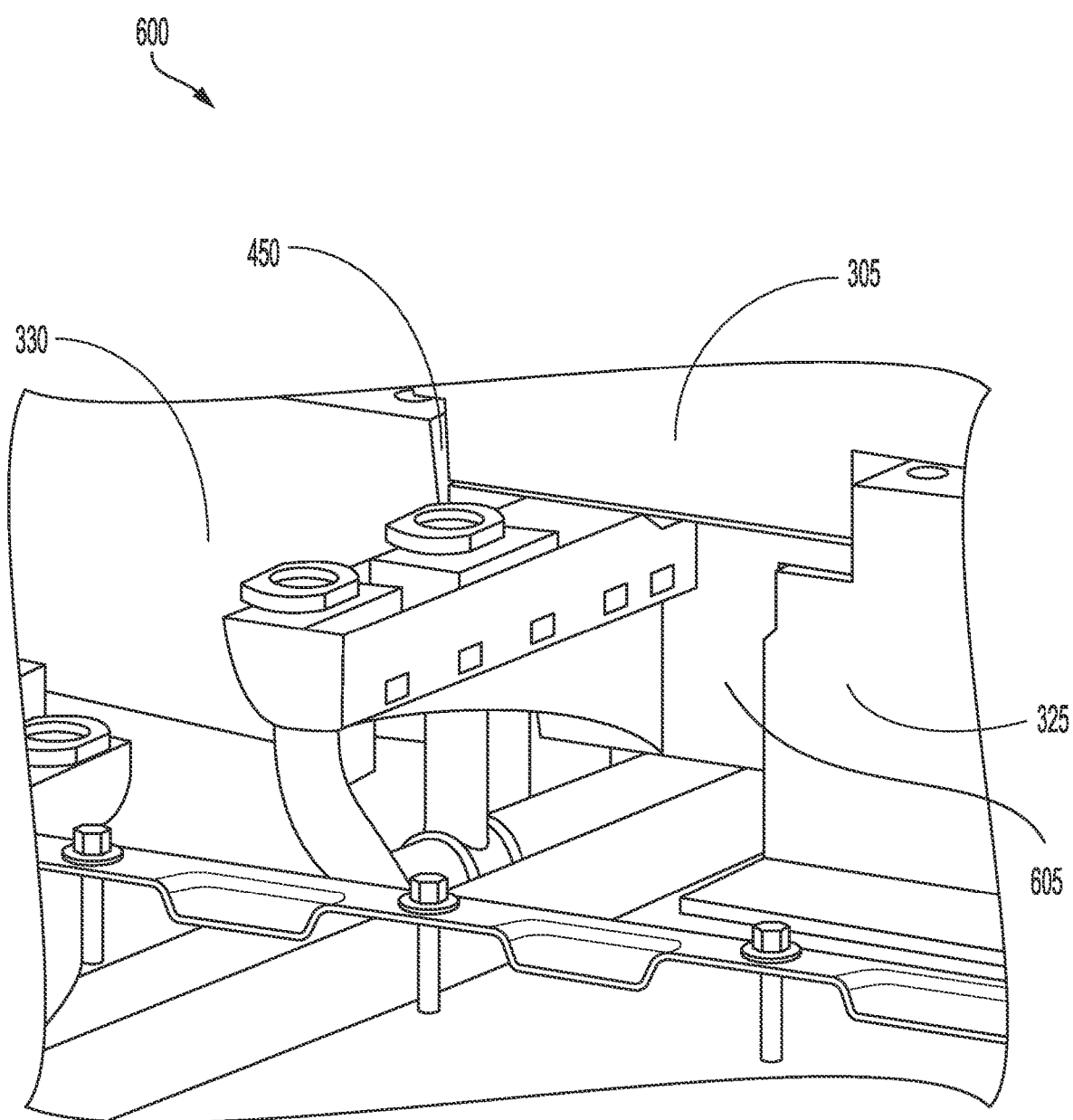
FIG. 6 depicts a perspective view of a section of the battery pack system, according to an exemplary embodiment.

FIG. 6 depicts a perspective view of a section 600 of the battery pack system 300. The section 600 of the battery pack system 300 can include at least one support 605. For example, the brackets 405, 420 can include the support 605. For example, the first bracket 405 and the second bracket 420 can be coupled via the support 605. For example, the first bracket 405 and the second bracket 420 can be coupled via the support 605 such that there is a single bracket in the battery pack 110 with a plurality of supports 605.

The first bracket 405 can couple with the first member 305 via the support 605. The first bracket 405 can couple with second member 325 via the support 605. The first bracket 405 can couple with third member 330 via the support 605. For example, the first bracket 405 can be positioned between the second member 325 and the third member 330. For example, the first bracket 405 can be positioned between the second member 325 and the third member 330 with the end surface 450 of the second member 325 and the end surface 450 of the third member 330 in contact with the support 605 of the first bracket 405. For example, the first bracket 405 can be positioned between the second member 325 and the third member 330 with the first member 305 positioned above the first bracket 405 (in an operational orientation of the battery pack). For example, the first member 305 can be positioned above the first bracket 405 (in an operational orientation of the battery pack) with the bottom surface 410 of the first member 305 in contact with the support 605 of the first bracket 405.

Figure 7:
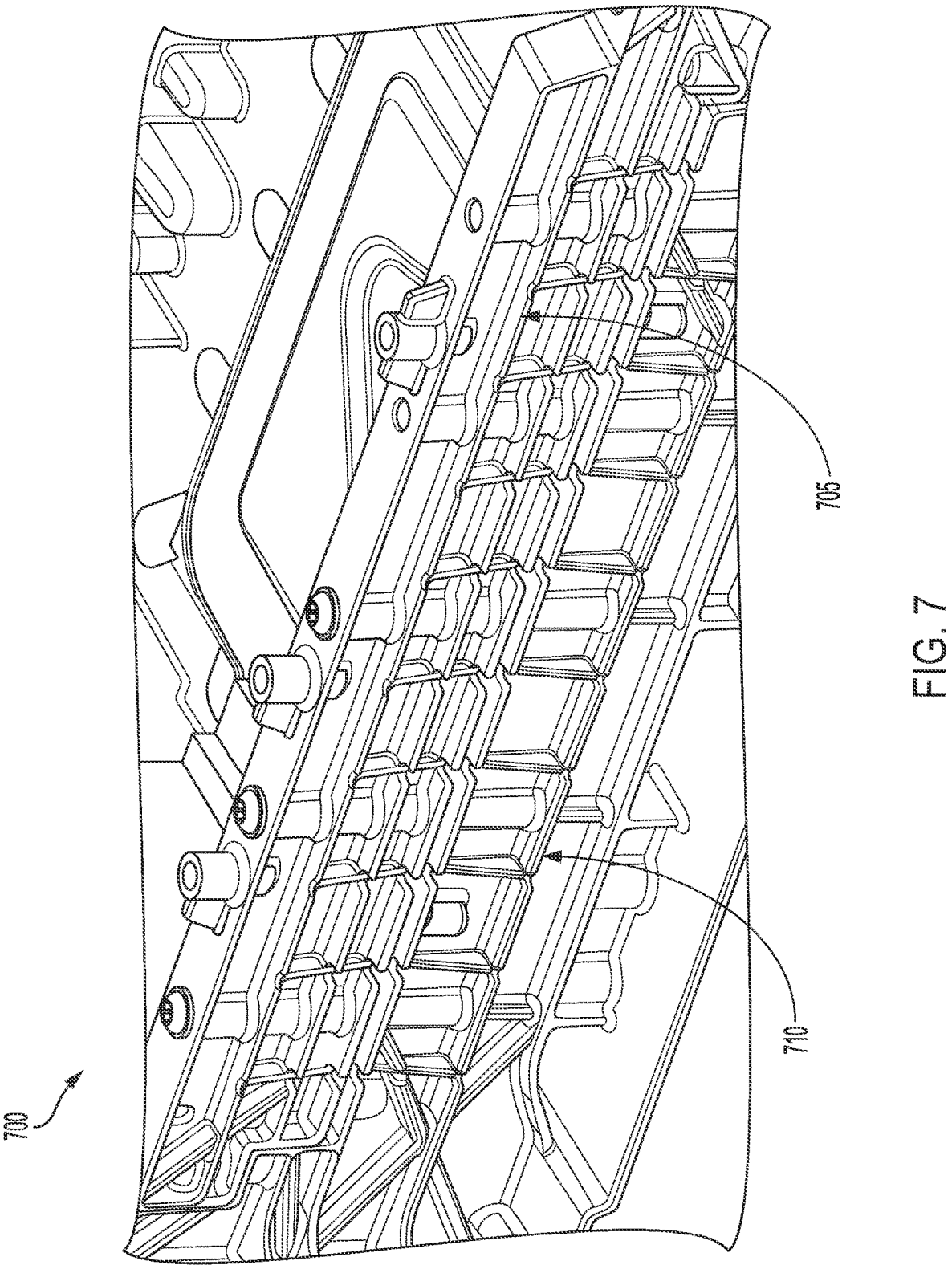
FIG. 7 depicts a perspective view of a section of the battery pack system, according to an exemplary embodiment.

FIG. 7 depicts a perspective view of a section 700 of the battery pack system 300. The members 305, 325, 330, 335, 425 can each have at least one surface that is ribbed. For example, the first member 305 can have a first member surface 705 that is ribbed. The first member surface 705 can be referred to herein as a keystone member surface 705. The first member surface 705 that is ribbed can be mirrored on the other side of the first member 305. For example, the second member 325 can have a second member surface 710 that is ribbed. The second member surface 710 that is ribbed can be mirrored on the other side of the second member 325.

The first member 305 and the second member 325 can engage with the battery module 115. For example, the first edge 545 of the battery module 115, e.g., the first battery module, can be ribbed. For example, the first edge 545 of the battery module 115, e.g., the first battery module, can be ribbed such that the ribs of the first edge 545 of the battery module 115 engage with the ribs of the first member 305 and the second member 325. The fourth member 335 and the fifth member 425 can engage with the battery module 115. For example, the second edge 550 of the battery module 115, e.g., the first battery module, can be ribbed. For example, the second edge 550 of the battery module 115, e.g., the first battery module, can be ribbed such that the ribs of the second edge 550 of the battery module 115 engage with the ribs of the fourth member 335 and the fifth member 425.

The ribs of the members 305, 325 335, 425 that can engage with the ribs of the battery module 115 can provide additional stability to the battery pack system 300. For example, any force applied to the first side 310 of the battery pack 110 will be distributed to the members 305, 325 335, 425 and the battery module 115. For example, the force will be distributed to the locating elements 455 and to the bolt that can engage with the first clearance bolt hole, e.g., the clearance bolt hole 460, and the first bolt hole, e.g., the bolt hole 465. The force will also be distributed to the brackets 405, 420. Therefore, the ribs of the members 305, 325 335, 425 that can engage with the ribs of the battery module 115 can provide additional stability to the battery pack system 300 because the force can additionally be distributed to the ribs of the members 305, 325 335, 425 and the ribs of the battery module 115, which will decrease the force that is distributed to the bolt, the locating elements 455, and the brackets 405, 420.

Figure 8:
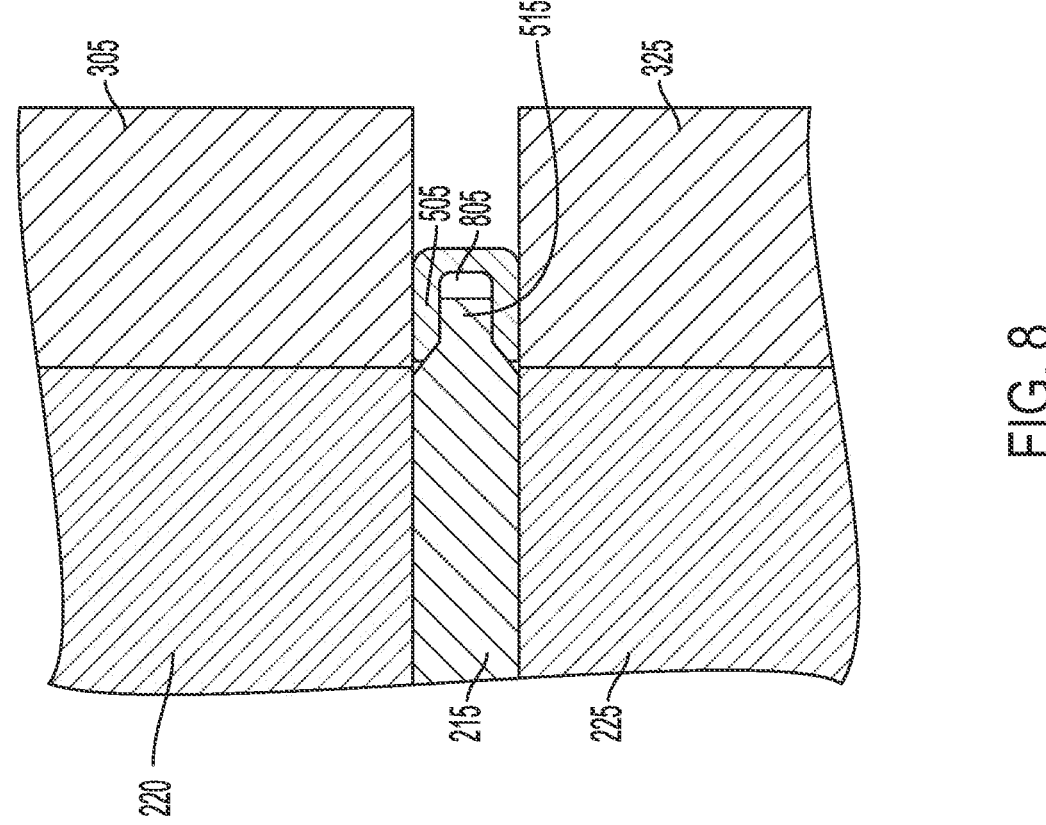
FIG. 8 depicts an internal view of a battery module flange, according to an exemplary embodiment.
Figure 8:
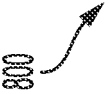

FIG. 8 depicts an internal view 800 of a battery module flange. As discussed herein, the first module flange 505 and the second module flange 525 can be partially hollow. For example, the first module flange 505 and the second module flange 525 can each define at least one open channel 805.

The open channel 805 can receive the thermal component 215. For example, the thermal component 215 can include the first portion 515. The first portion 515 can be received by the open channel 805. The first portion 515 and the second portion 530 of the thermal component 215 can expand relative to a change in temperature. In the event that the first portion 515 and the second portion 530 of the thermal component 215 expand, the open channel 805 of the first module flange 505 and the second module flange 525 can receive the first portion 515 and the second portion 530, respectively. For example, the first portion 515 of the thermal component 215 can expand into the open channel 805 with the first portion 515 of the thermal component 215 positioned between the first member 305 and the second member 325. For example, the first member 305 and the second member 325 can engage with the first module flange 505 including the first portion 515 of the thermal component 215, with the first portion 515 of the thermal component 215 positioned between the first member 305 and the second member 325. For example, the fourth member 335 and the fifth member 425 can engage with the second module flange 525 including the second portion 530 of the thermal component 215, with the second portion 530 of the thermal component 215 positioned between the fourth member 335 and the fifth member 425.

Figure 9:
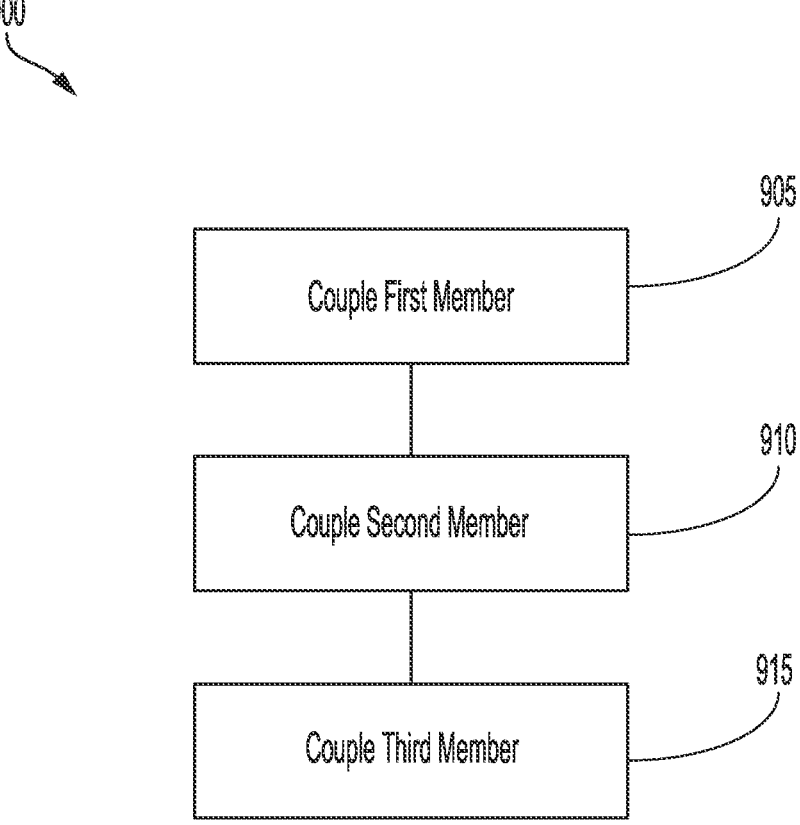
FIG. 9 depicts a flow diagram illustrating a method, according to an exemplary embodiment.

FIG. 9 depicts a flow diagram illustrating a method 900. Method 900 can include a method of assembling a mount in a battery pack 110. Method 900 can include coupling a first member 305 with a first side 310 of a battery pack 110 and with a second side 320 of the battery pack 110 (ACT 905). For example, the first member 305 can be welded, bolted, or glued with the first side 310 and with the second side 320 of the battery pack 110. For example, the first member 305 can be manufactured as an extension of the first side 310 and the second side 320 of the battery pack 110.

Method 900 can include coupling a second member 325 with the first member 305 and with the first side 310 of the battery pack 110 (ACT 910). For example, the second member 325 can be welded, bolted, or glued with the first side 310 of the battery pack 110. For example, the second member 325 can be manufactured as an extension of the first side 310 of the battery pack 110. For example, the second member 325 can be welded, bolted, glued, clamped, or fitted with the first member 305. For example, the second member 325 can be coupled below the first member 305 (in an operational orientation of the battery pack). For example, the second member 325 can be manufactured as part of the first member 305.

Method 900 can include coupling a third member 330 with the first member 305 and with the second side 320 of the battery pack 110 (ACT 915). For example, the third member 330 can be welded, bolted, or glued with the second side 320 of the battery pack 110. For example, the third member 330 can be manufactured as an extension of the second side 320 of the battery pack 110. For example, the third member 330 can be welded, bolted, glued, clamped, or fitted with the first member 305. For example, the third member 330 can be coupled below the first member 305 (in an operational orientation of the battery pack). For example, the third member 330 can be manufactured as part of the first member 305.

Figure 10:
FIG. 10 depicts a flow diagram illustrating a method, according to an exemplary embodiment.
Figure 10:
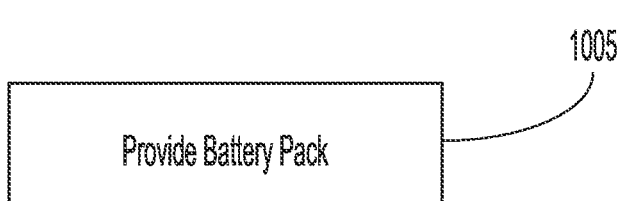

FIG. 10 depicts a flow diagram illustrating a method 1000. Method 1000 can be a method of providing a battery pack with a mount. The method 1000 can include providing a battery pack 110 (ACT 1005). The battery pack 110 can include a first member 305. The first member 305 can couple with a first side 310 of the battery pack 110. The first member 305 can couple with a second side 320 of the battery pack 110. The battery pack 110 can include a second member 325. The second member 325 can couple with the first member 305. The second member 325 can couple with the first side 310 of the battery pack 110. The battery pack 110 can include a third member 330. The third member 330 can couple with the first member 305. The third member 330 can couple with the second side 320 of the battery pack 110.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The invention claimed is:

1. An apparatus, comprising:

a keystone member to couple with a first side of a battery pack and with a second side of the battery pack, the keystone member to engage with a first module flange and a second module flange;

a second member to couple with the keystone member and with the first side of the battery pack, the first module flange positioned between the keystone member and the second member;

a third member to couple with the keystone member and with the second side of the battery pack, the second module flange positioned between the keystone member and the third member;

a bottom surface of the keystone member, an end surface of the second member, and an end surface of the third member define a gap;

a length of the gap along a longitudinal axis of the keystone member is less than a length of the second member along the longitudinal axis and a length of the third member along the longitudinal axis;

a bracket to couple with the keystone member and the third member;

a fourth member to couple with the first side of the battery pack and with the second side of the battery pack;

a fifth member to couple with the first side of the battery pack, the bracket to couple with the fourth member and the fifth member;

the bracket defining an opening between the keystone member and the fourth member, the opening in fluid communication with a fluid manifold;

the first module flange disposed at an edge of a first battery module and including a first portion of a first thermal component with the first portion of the first thermal component positioned between the keystone member and the second member;

the second module flange disposed at an edge of a second battery module and including a second portion of a second thermal component with the second portion of the second thermal component positioned between the fourth member and the fifth member;

the first module flange positioned at a center of gravity of the first battery module; and the second module flange positioned at a center of gravity of the second battery module.

2. The apparatus of claim 1, wherein the keystone member comprises a first lateral cross member, the apparatus comprising:

a first bracket to couple with a bottom surface of the first lateral cross member and with a top surface of the second member, the first lateral cross member and the second member to define a first compartment for the first battery module; and a second bracket to couple with the first lateral cross member and the third member, the first lateral cross member and the third member to define a second compartment for the second battery module;

the second bracket to couple with a bottom surface of the fourth member and with a top surface of the fifth member with the fourth member above the second bracket and the fifth member below the second bracket;

the first lateral cross member, the second member, the fourth member, and the fifth member configured to define the first compartment for the first battery module.

3. The apparatus of claim 1, comprising:

a first bracket to couple with a bottom surface of the keystone member and with a top surface of the second member with the keystone member above the second member; and a second bracket to couple with the bottom surface of the keystone member and a top surface of the third member with the keystone member above the third member;

the second member and the third member are aligned along the longitudinal axis.

4. The apparatus of claim 1, comprising:
the bracket to couple with the keystone member and a bus bar.

5. The apparatus of claim 1, comprising:
the second member including a flange to engage with a battery module;
the flange of the second member welded to a base of the battery pack; and
the third member welded to the base of the battery pack.

6. The apparatus of claim 1, comprising:
the first module flange defining an open channel to receive the first portion of the first thermal component; and
the first portion of the thermal component to expand into the open channel with the first portion of the thermal component positioned between the keystone member and the second member.

7. The apparatus of claim 1, comprising:
the keystone member including a protrusion to contact the end surface of the second member and the end surface of the third member.

8. The apparatus of claim 1, comprising:
a bracket to couple with the keystone member and the third member, the bracket including a support positioned between the second member and the third member with the end surface of the second member and the end surface of the third member in contact with the support of the bracket.

9. The apparatus of claim 1, comprising:
the second member including a locating element to locate a portion of the first module flange and couple with the portion; and
the keystone member defining a clearance bolt hole with the keystone member coupled with the second member via a bolt.

10. The apparatus of claim 1, comprising:
the keystone member defining a first clearance bolt hole and a second clearance bolt hole;
the second member defining a first bolt hole, the keystone member coupled with the second member via a bolt to engage with the first bolt hole and the first clearance bolt hole; and
the third member defining a second bolt hole, the keystone member coupled with the third member via a second bolt to engage with the second bolt hole and the second clearance bolt hole.

11. The apparatus of claim 1, comprising:
the keystone member including a keystone member surface with the keystone member surface ribbed;
the second member including a second member surface with the second member surface ribbed; and
a battery module including a first edge, the first module flange disposed at the first edge of the battery module and the first edge ribbed to engage with the keystone member surface and the second member surface.

12. The apparatus of claim 1, comprising:
a bottom portion of the keystone member defines a cutout region and a top portion of the second member includes a protrusion configured to insert into the cutout region.

13. The apparatus of claim 1, wherein the second member and the third member are separate components.

14. The apparatus of claim 1, wherein the first module flange and the second module flange are partially hollow.

15. An electric vehicle, comprising:
a battery pack;
a keystone member to couple with a first side of the battery pack and with a second side of the battery pack, the keystone member to engage with a first module flange and a second module flange;

a second member to couple with the keystone member and with the first side of the battery pack, the first module flange positioned between the keystone member and the second member;

a third member to couple with the keystone member and with the second side of the battery pack, the second module flange positioned between the keystone member and the third member;

a bottom surface of the keystone member, an end surface of the second member, and an end surface of the third member define a gap;

a length of the gap along a longitudinal axis of the keystone member is less than a length of the second member along the longitudinal axis and a length of the third member along the longitudinal axis;

a bracket to couple with the keystone member and the third member;

a fourth member to couple with the first side of the battery pack and with the second side of the battery pack, the fourth member parallel to the keystone member; and a fifth member to couple with the first side of the battery pack, the bracket to couple with the fourth member and the fifth member, the fifth member parallel to the second member;

the bracket defining an opening between the keystone member and the fourth member, the opening in fluid communication with a fluid manifold;

the first module flange disposed at an edge of a first battery module and including a first portion of a first thermal component with the first portion of the first thermal component positioned between the keystone member and the second member;

the second module flange disposed at an edge of a second battery module and including a second portion of a second thermal component with the second portion of the second thermal component positioned between the fourth member and the fifth member;

the first module flange positioned at a center of gravity of the first battery module; and the second module flange positioned at a center of gravity of the second battery module.

* * * * *